March 24, 1953 W. H. FENN 2,632,796
FLUXMETER
Filed April 1, 1946

INVENTOR
WILLARD H. FENN

BY M. Hayes

ATTORNEY

Patented Mar. 24, 1953

2,632,796

UNITED STATES PATENT OFFICE 2,632,796

FLUXMETER

Willard H. Fenn, Cambridge, Mass., assignor, by mesne assignments, to the United States of America as represented by the Secretary of the Navy Application April 1, 1946, Serial No. 658,595

4 Claims. (Cl. 175—183)

This invention relates to secondary electrical measuring equipment and more particularly to a measuring device for determining the flux density of a magnetic field.

The usual practice for measuring the flux density B of a magnetic field is by means of an exploring coil attached to a ballistic galvanometer. While this method is satisfactory for laboratory use, it is too slow and cumbersome for portable use. In addition, the ballistic galvanometer is delicate and therefore requires careful handling and cannot be readily moved about.

This invention provides a novel flux meter using a D'Arsonval probe which is highly sensitive and which is of rugged construction.

The general object of this invention is to provide a rugged portable instrument for determining magnetic flux density B.

Another object of this invention is to provide an instrument for determining magnetic flux density B which is direct reading on a calibrated scale graduated in gauss.

A further object of this invention is to provide an instrument for determining the value of magnetic flux density B over the normal range of values encountered in working with permanent magnets.

A still further object of this invention is to provide an instrument which will indicate the direction of the lines of force of a magnetic field.

These and other objects will be apparent from the following specification when taken with the accompanying drawings, in which.

Figure 1:
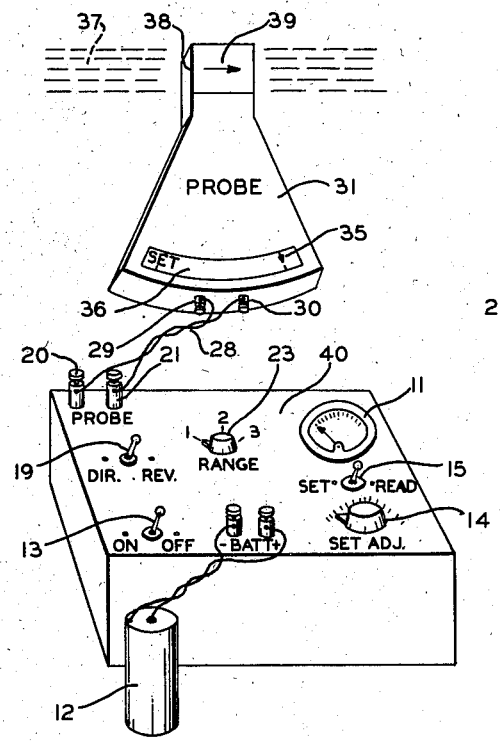
Fig. 1 is a perspective sketch of one embodiment of the invention as applied to a three range portable gauss meter.
Figure 2:
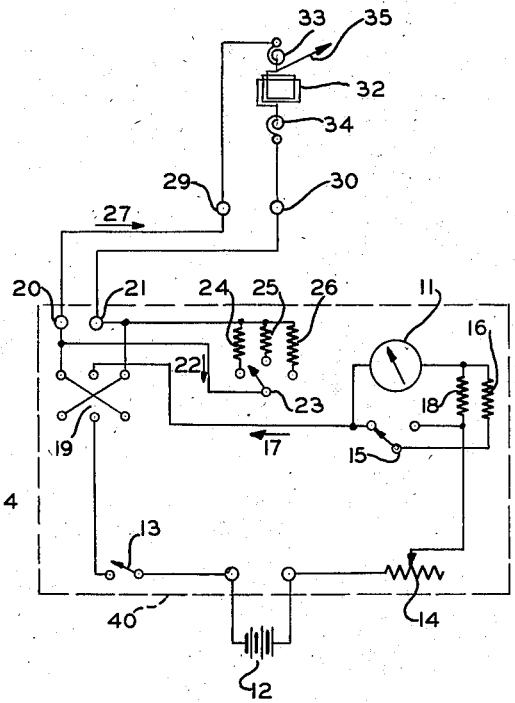
Fig. 2 is a diagrammatic representation of the electrical circuit of Fig. 1.
Figure 5:
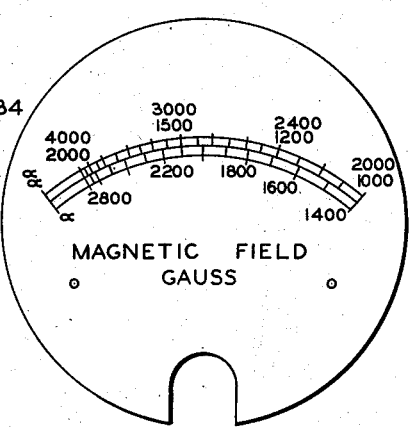
Fig. 5 is a plan view of an instrument dial showing a representative calibration suitable for use as the indicator with this invention.

Referring to Figs. 1 and 2, an embodiment of the invention is shown in which the magnetic flux density B to be measured may be read directly on a calibrated scale, such as shown in Fig. 5, on a direct current milliammeter 11. The current to deflect milliammeter 11 is secured from a battery 12 and controlled by means of a switch 13 and a rheostat 14. A switch 15 is arranged to parallel the meter 11 with a resistance 16 when it is in the "Set" position for the purpose of protecting the meter against overload during adjustment of the instrument. In order to maintain the current 17 at a constant value regardless of the position of switch 15 a compensating resistance 18 is arranged to be in parallel with resistance 16 when the switch 15 is in the "Read" position. The ohmic value of resistance 18 must be equal in value to the ohmic resistance of the meter 11. It will be apparent that the ohmic value of resistance 16 will depend on the degree of protection deemed desirable for meter 11. If the ohmic value of the resistance 16 is made equal to that of resistance 18 and of meter 11, then said meter 11 will deflect only one half the amount with the switch 15 in the "Set" position that it would with the switch 15 in the "Read" position. The current 17 is connected through a switch 19 to a pair of binding posts 20 and 21. The effect of switch 19 is to reverse the polarity of current 17 as it appears at binding posts 20 and 21.

The current 17 divides into two parts at binding posts 20 and 21. One part of the current, 22, flows through a range selector switch 23 to one of three resistors 24, 25, or 26. The ohmic value of resistance 24 is greater than that of resistance 25 which in turn is greater than that of resistance 26. Position #1 of range switch 23 selects resistor 24, position #2 selects resistor 25, and position #3 selects resistor 26. Therefore position #1 of range switch 23 will be low range and position #3 will be high range. The other part of the current, 27, flows through a flexible cord 28 to a pair of binding posts 29 and 30 attached to a D'Arsonval probe 31 and thence to a coil 32 mounted pivotally within said probe 31. The sum of current 27 and of current 22 is always equal in value to current 17.

It can be seen that the effect of range switch 23 is to select different values of resistance to current 22 thereby changing the proportion of current 27 to the current 17. Therefore, it can readily be seen that the deflection of meter 11 which is proportional to current 17 will also be proportional to current 27, the proportionality constant being selected by means of range switch 23. Coil 32 is flexibly and yieldably held in a predetermined position by means of spiral springs 33 and 34 which also serve for electrical connections to the coil 32. A pointer 35 is rigidly affixed to the coil 32 so that it moves over a marked scale 36 on probe 31. The pointer 35 rests normally at a "0" mark at one extremity of the scale 36, and a vernier adjustment of spring 33 is provided in order to compensate for any small variables in construction and thus assure that the "0" position can be maintained during the life of the instrument.

In operation, the probe 31 is positioned in a magnetic field 37 so that the lines of force of said field 37 are normal to face 38 of probe 31. With switch 15 in the "Set" position, switch 13 in the "On" position, switch 23 in position #3, and switch 19 in the "Direct" position there will be a deflection of pointer 35. If this deflection is toward the "Set" mark of scale 36, the direction of the field is indicated by an arrow 39 imprinted on the case of probe 31. Should the deflection of pointer 35 be away from the "Set" mark on scale 36, it is reversed by placing switch 19 in the "Reverse" position, which operation indicates that the field is opposite in direction to the arrow 39. With switch 19 set to secure positive deflection, rheostat 14 is adjusted until pointer 35 is opposite the "Set" mark on scale 36. The magnetic flux density B may be read directly in gauss on the high scale of meter 11 by placing switch 15 in the "Read" position. If the deflection of meter 11 is not adequate for a good determination of the flux density, the range switch 23 is shifted to a smaller range and the balancing process repeated.

Figure 3:
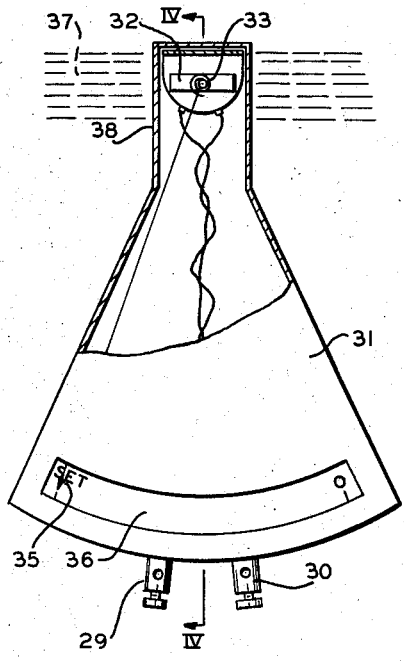
Fig. 3 is a top view in partial section showing the arrangement of the D'Arsonval probe incorporated in the embodiment of Fig. 1 and Fig. 2.
Figure 4:
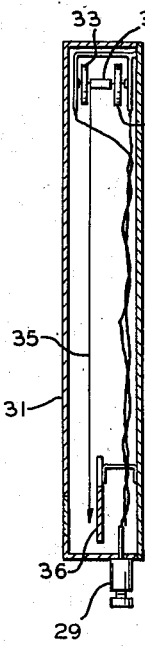
Fig. 4 is a sectional view along the line IV—IV of Fig. 3.

The position of coil 32 in relation to the magnetic field 37 when the pointer 35 is adjusted to the "Set" mark on scale 36 may be seen by reference to Fig. 3 which is a partial sectional view of the probe 31. The axis about which coil 32 is pivotally mounted is arranged parallel to face 38 of probe 31 and thus perpendicular to the lines of force 37 of the magnetic field since it is stipulated that the probe face 38 is positioned so as to be normal to the magnetic field 37. Also, the coil 32 is so arranged in relation to pointer 35 that the plane of said coil 32 is perpendicular to face 38 and thus parallel with the lines of force 37 of the magnetic field at all times whenever the pointer is directed to the "Set" position. This position of coil 32 is desirable since it results in maximum torque being exerted on coil 32 due to interaction of the current 27 flowing in said coil 32 with the magnetic field 37. This large torque is desirable since it results in an instrument having high sensitivity. It can readily be understood that no portion of the probe 31 must contain magnetic material, even in a minute degree, otherwise the accuracy of the instrument will be impaired. To this end a very pure metal, such as magnetically pure surgical silver should be used for the windings and connections to coil 32. All other parts are non-metallic and therefore it is not so difficult to select a suitable material for their construction. Among other non-magnetic materials, magnetically pure plastic is suitable for use in the probe 31. All elements of the instrument except the probe 31 and battery 12 are housed in a case 40 and connection is through flexible wire cables attached to suitable binding posts.

There has thus been described and illustrated a flux meter for measuring the strength of a magnetic field (flux density=B) consisting of a coil rotatably mounted in a suitable housing, a current source operatively connected to the coil, means for varying the current applied to the coil, and a current sensitive meter which may be calibrated in magnetic field strength units, such as gauss, for indicating the flux density of the magnetic field. As heretofore stated the coil is oriented substantially parallel to the lines of flux in order to provide greater sensitivity.

What is claimed is:

1. A fluxmeter for measuring magnetic flux density consisting of a probe containing a D'Arsonval meter movement, a current source, means including a current sensitive meter for supplying current from said source to said movement, and means to vary said current to provide a standard deflection of said movement, said current sensitive meter being calibrated in magnetic field strength units for indicating the flux density of said magnetic field.

2. A fluxmeter for measuring magnetic flux density consisting of a probe containing a coil of wire rotatably mounted and yieldably biased to a predetermined position, a current source, means including a current sensitive meter for supplying current from said source to said coil, said meter being calibrated in magnetic field strength units, and means for varying the current supplied to said coil to produce a standard deflection of said coil, whereby the flux density of the magnetic field at said coil is indicated by said meter.

3. A fluxmeter for measuring magnetic flux density consisting of a probe in the form of a nonmagnetic housing, a coil of wire rotatably mounted within said housing, a pointer rigidly mounted on said coil, means for resiliently biasing said coil to a predetermined position, a current source, means including a current sensitive meter for supplying current from said source to said coil, said meter being calibrated in magnetic field strength units, and means for varying the current supplied to said coil to produce a standard deflection of said pointer, whereby the flux density of the magnetic field at said probe is indicated by said meter.

4. A fluxmeter for measuring magnetic flux density consisting of a probe containing a D'Arsonval meter movement, the coil of said movement being oriented substantially parallel to the lines of force of said magnetic flux whenever measurements are made, a current source, means including a current sensitive meter operatively connected to supply current from said source to said coil, means for varying the current applied to said coil to obtain a predetermined deflection of said coil in said field, said current sensitive meter being calibrated in magnetic units for indicating said flux density.

WILLARD H. FENN.

REFERENCES CITED

The following references are of record in the file of this patent:

UNITED STATES PATENTS

| Number | Name | Date |
| --- | --- | --- |
| 1,666,309 | Ray | Apr. 17, 1928 |
| 2,010,813 | Dysart | Aug. 13, 1935 |
| 2,335,117 | Harrison | Nov. 23, 1943 |
| 2,338,991 | Arnold | Jan. 11, 1944 |

FOREIGN PATENTS

| Number | Country | Date |
| --- | --- | --- |
| 207,680 | Great Britain | Dec. 6, 1923 |